United States Patent
Srack et al.

(10) Patent No.: US 7,120,524 B2
(45) Date of Patent: Oct. 10, 2006

(54) SYSTEM FOR MEASURING POINTS ON A VEHICLE DURING DAMAGE REPAIR

(75) Inventors: Robert W. Srack, Salina, KS (US); Dwight Day, Manhattan, KS (US)

(73) Assignee: Matrix Electronic Measuring, L.P., Salina, KS (US)

(*) Notice: Subject to any disclaimer, the term of this patent is extended or adjusted under 35 U.S.C. 154(b) by 0 days.

(21) Appl. No.: 10/974,288

(22) Filed: Oct. 27, 2004

(65) Prior Publication Data

US 2005/0125119 A1   Jun. 9, 2005

Related U.S. Application Data

(60) Provisional application No. 60/527,464, filed on Dec. 4, 2003.

(51) Int. Cl.
*G06F 19/00* (2006.01)
*G01B 29/04* (2006.01)
*G01B 11/00* (2006.01)
*G01C 15/02* (2006.01)

(52) U.S. Cl. .............. 701/33; 701/300; 33/288; 33/293; 356/620; 356/401; 356/139.1; 356/139.09; 356/139.05; 356/139.06; 702/37; 702/36; 702/158; 702/159; 382/106; 382/152; 382/141

(58) Field of Classification Search ............ 701/33, 701/301; 33/288, 293; 356/620, 401, 139.1, 356/139.09, 139.05, 139.06; 702/37, 36, 702/158, 159; 382/106, 152, 141

See application file for complete search history.

(56) References Cited

U.S. PATENT DOCUMENTS

| | | | |
|---|---|---|---|
| 4,329,784 A | 5/1982 | Bjork | |
| 4,442,608 A | 4/1984 | Clausen | |
| 4,490,918 A | 1/1985 | Clausen | |
| 4,513,508 A | 4/1985 | Jarman et al. | |
| 4,546,638 A | 10/1985 | Field | |
| 4,598,481 A | 7/1986 | Donahue | |
| 4,630,379 A | 12/1986 | Wickmann et al. | |
| 4,675,730 A * | 6/1987 | Adomaitis et al. | 348/131 |
| 4,803,645 A * | 2/1989 | Ohtomo et al. | 702/167 |
| 4,811,250 A | 3/1989 | Steber et al. | |
| 4,895,448 A | 1/1990 | Laird | |
| 4,934,063 A | 6/1990 | Speisser | |
| 4,997,283 A | 3/1991 | Danielson et al. | |
| 5,014,442 A * | 5/1991 | LeGrand et al. | 33/608 |
| 5,029,397 A | 7/1991 | Palombi | |
| 5,054,207 A | 10/1991 | Marshall | |
| 5,175,601 A * | 12/1992 | Fitts | 356/604 |
| 5,193,288 A | 3/1993 | Stifnell | |
| 5,295,073 A | 3/1994 | Celette | |
| 5,307,151 A | 4/1994 | Hof et al. | |
| 5,383,454 A | 1/1995 | Bucholz | |

(Continued)

*Primary Examiner*—Thomas G. Black
*Assistant Examiner*—Brian J. Broadhead
(74) *Attorney, Agent, or Firm*—Kenneth W. Iles (57) ABSTRACT

A carriage moves back and forth under a vehicle and three cameras or laser fixed along one axis pivot in a common plane, utilizing two cameras at time to locate a target fixed to a reference point on the undercarriage of the vehicle. Triangulation calculations, combined with the location of the cameras provide the location of the reference point in space in a three-dimensional coordinate system and compare that location with a stored designed location of the reference point prior to the crash, allowing the vehicle structure to be returned to its designed shape by other equipment.

17 Claims, 9 Drawing Sheets

U.S. PATENT DOCUMENTS

| | | | | |
|---|---|---|---|---|
| 5,446,548 A | * | 8/1995 | Gerig et al. | 356/620 |
| 5,505,000 A | | 4/1996 | Cooke | |
| 5,515,613 A | | 5/1996 | Hinson | |
| 5,532,816 A | | 7/1996 | Spann et al. | |
| 5,561,526 A | * | 10/1996 | Huber et al. | 356/604 |
| 5,612,905 A | * | 3/1997 | Maillart et al. | 702/153 |
| 5,622,170 A | | 4/1997 | Schultz | |
| 5,642,299 A | * | 6/1997 | Hardin et al. | 702/142 |
| 5,644,854 A | | 7/1997 | Bergeron | |
| RE35,816 E | | 6/1998 | Schulz | |
| 5,768,137 A | * | 6/1998 | Polidoro et al. | 700/186 |
| 6,040,910 A | | 3/2000 | Wu et al. | |
| 6,100,984 A | | 8/2000 | Chen et al. | |
| 6,115,927 A | * | 9/2000 | Hendrix | 33/288 |
| 6,165,181 A | | 12/2000 | Heilbrun et al. | |
| 6,341,013 B1 | * | 1/2002 | Battiti et al. | 356/139.09 |
| 6,456,372 B1 | * | 9/2002 | Hudy | 356/155 |
| 6,601,309 B1 | | 8/2003 | Hedstrom | |
| 6,775,639 B1 | * | 8/2004 | Mason | 702/152 |
| 6,829,046 B1 | * | 12/2004 | Groothuis et al. | 356/155 |
| 6,950,775 B1 | * | 9/2005 | Kling et al. | 702/150 |
| 2001/0024512 A1 | * | 9/2001 | Yoronka et al. | 382/103 |
| 2002/0002330 A1 | | 1/2002 | Vilsmeier | |
| 2002/0029128 A1 | | 3/2002 | Jones et al. | |
| 2002/0038084 A1 | | 3/2002 | Pelzer et al. | |
| 2002/0066193 A1 | * | 6/2002 | Hodge | 33/293 |
| 2002/0087075 A1 | | 7/2002 | Bucholz | |
| 2002/0104390 A1 | * | 8/2002 | Jones | 73/866.5 |
| 2003/0048459 A1 | * | 3/2003 | Gooch | 356/620 |
| 2003/0053679 A1 | * | 3/2003 | Horn et al. | 382/152 |
| 2003/0090682 A1 | * | 5/2003 | Gooch et al. | 356/620 |
| 2004/0258293 A1 | * | 12/2004 | Rouse et al. | 382/141 |

* cited by examiner

SYSTEM FOR MEASURING POINTS ON A VEHICLE DURING DAMAGE REPAIR

CROSS-REFERENCE TO RELATED APPLICATIONS

This Application claims priority under 35 U.S.C. §119 (e)(1) from U.S. Provisional Patent Application, application No. 60/527,464, filed Dec. 4, 2003. The attached text and drawings are an exact duplicate of the cited provisional patent application with all the claims and this paragraph having been added to the text; and the inventors are identical in both the earlier filed provisional patent application and the present application.

STATEMENT REGARDING FEDERALLY SPONSORED RESEARCH OR DEVELOPMENT

Not applicable.

BACKGROUND OF THE INVENTION

The present invention is related to an apparatus and process for determining the location of a point in space and measuring the deviation of that location from a desired position. More particularly, the preferred embodiment of the present invention is directed to measuring the deviation of certain points on a damaged motor vehicle from their proper location to facilitate the repair of the vehicle.

DESCRIPTION OF THE RELATED ART INCLUDING INFORMATION DISCLOSED UNDER 37 C.F.R. 1.97 and 1.98.

When motor vehicles are damaged in collisions or wrecks, the structures of the vehicle, particularly those providing structural integrity to the vehicle, are often bent or otherwise deformed. To restore proper handling of the vehicle, its structure must be returned to its designed configuration. To accomplish this, certain points on the vehicle, principally on the undercarriage or chassis, but also on the vehicle's body, are measured in relation to one or more fixed reference points, such as the location of the measuring equipment and those measurements are compared to a database containing the location of those same points on an undamaged vehicle of the same make and model. Through this comparison, the distance and direction of the deviation of a particular point on the vehicle chassis or body from the design location is calculated. Then pulling equipment, which is not part of the present invention and which is not illustrated herein, is used to bend the chassis back into its more or less original configuration and alignment, with repeated measuring of the deviation of the reference points from their desired locations made throughout the process.

Because the vehicle collision repair industry is very large, many extensive efforts to address measuring the deviations of selected points on the chassis of a wrecked vehicle with the desired locations of these points and these efforts have led to a number of patents, a few of which are discussed below. All of these prior art systems have failings that inhibit their widespread use and industry approval.

Bjork, U.S. Pat. No. 4,329,784, for example relies on a physical coordinate system with measuring marks, that is, rulers, inscribed on the measuring frame members, with the worker merely reading the numbers that are adjacent to the reference point. This system allows for errors in setting up the rulers and in reading the measurements and is very time consuming and laborious.

Bucholz, U.S. Patent Application Publication Number 2002/0087075 A1, discloses a "System for Indicating the Position of a Surgical Probe within a Head on an Image of the Head" comprising computer software to plot the location of a probe inside a patient's head which utilizes sound emitters and microphone detectors, or, alternatively, infrared emitters and detectors. Reference pins may be affixed to the skull to determine the position of the patient's head during surgery. The emitters are rapidly energizing the emitters one at a time in a predetermined sequence and then measuring the time required for the individual sound to reach each of the microphones 350 in the array 300. A three dimensional digitizer controls this process. The ambient noise in vehicle repair shops interferers with any type of acoustic signals.

Vilsmeier, U.S. Patent Application Publication Number 2002/0002330 A1, discloses a "Referencing or Registering a Patient or a Patient Body Part in a Medical Navigation System by Means of Irradiation of Light Points" comprising shining a light beam, preferably from an infrared laser onto a patient to produce a spot of light, which replaces a conventional marker. About twenty light spots are created, which are recognized by a pair of spaced infrared cameras both mounted on a camera mount. The cameras appear to be stationary relative to one another and are only moved, along with the whole camera mount, when needed to get out of shadows, such as from the patient's nose, and then the movement of the camera mount is recorded indirectly through measurements of reflected light from the reference adapter, which is a three reflector indexing monitor. The cameras take a large number of images, which are manipulated by a computer to determine the shape of the patient's face. This system is inadequate for present purposes because in vehicle repair, the reference points are given by the manufacturer or others and cannot be selected by the user. Further these reference points are principally underneath the vehicle and cannot be conveniently illuminated or otherwise located from a single fixed source.

These references do not disclose a measurement system that utilizes multiple cameras to provide triangulation calculations that are based on the two camera closer to the reference point; that automatically moves the sensor cameras to a location proximate to the relevant reference point; that utilizes a target searching routine to center the cameras on a target and reports when the target has been centered in the camera's field of view.

BRIEF SUMMARY OF THE INVENTION

Accordingly, it is a primary object of a system for measuring points on a vehicle during damage repair according to the present invention to that utilizes multiple cameras to provide triangulation calculations that are based on the two camera closer to the reference point.

It is a further object of the system for measuring points on a vehicle during damage repair according to the present invention that automatically moves the sensor cameras to a location proximate to the relevant reference point.

It is a further object of the system for measuring points on a vehicle during damage repair according to the present invention that.

It is a further object of the system for measuring points on a vehicle during damage repair according to the present invention that utilizes a target searching routine to center the cameras on a target and reports when the target has been centered in the camera's field of view.

The system for measuring points on a vehicle during damage repair utilizes encoder motors, sometimes called servos, which rotate a drive shaft in fine, measurable increments, such as 2,000 increments per revolution, to rotate at least two cameras fixed in a single plane and along the same line until they are centered on a target that includes concentric rings of light and dark circular patterns and calculates the location of the point through well-know standard triangulation techniques based on the law of sines using custom computer software. The at least two cameras are spaced from one another by an equal fixed amount along a spacer bar. The spacer bar may be mounted for precisely measured movement along a particular axis.

Preferably, two separate measuring units are set up around the vehicle, including a front-end measuring unit and an undercarriage measuring unit that lies on the floor or other structure parallel to the plane of the undercarriage of the vehicle and travels back and forth underneath the vehicle. Each of these measuring units will locate one or more targets affixed to specific points on the vehicle 16, measure the location of the each point in space, compare the location of each point to its designed location relative to an index or reference point, and calculate the deviation of each target point from its designed location, noting both direction a three-dimensional grid measuring system, which may conveniently be a xyz coordinate space and display this information in a format that can be used by a repairman. These calculations are made many times as the vehicle is pulled or otherwise reformed to its designed specifications.

Other objects and advantages of the present invention will become apparent from the following description taken in connection with the accompanying drawings, wherein is set forth by way of illustration and example, the preferred embodiment of the present invention and the best mode currently known to the inventor for carrying out his invention.

BRIEF DESCRIPTION OF THE SEVERAL VIEWS OF THE DRAWINGS

FIG. 13 is a schematic bottom view of an automobile chassis.

FIG. 14 is a schematic side view of the automobile chassis of FIG. 13.

DETAILED DESCRIPTION OF THE INVENTION

Figure 1:
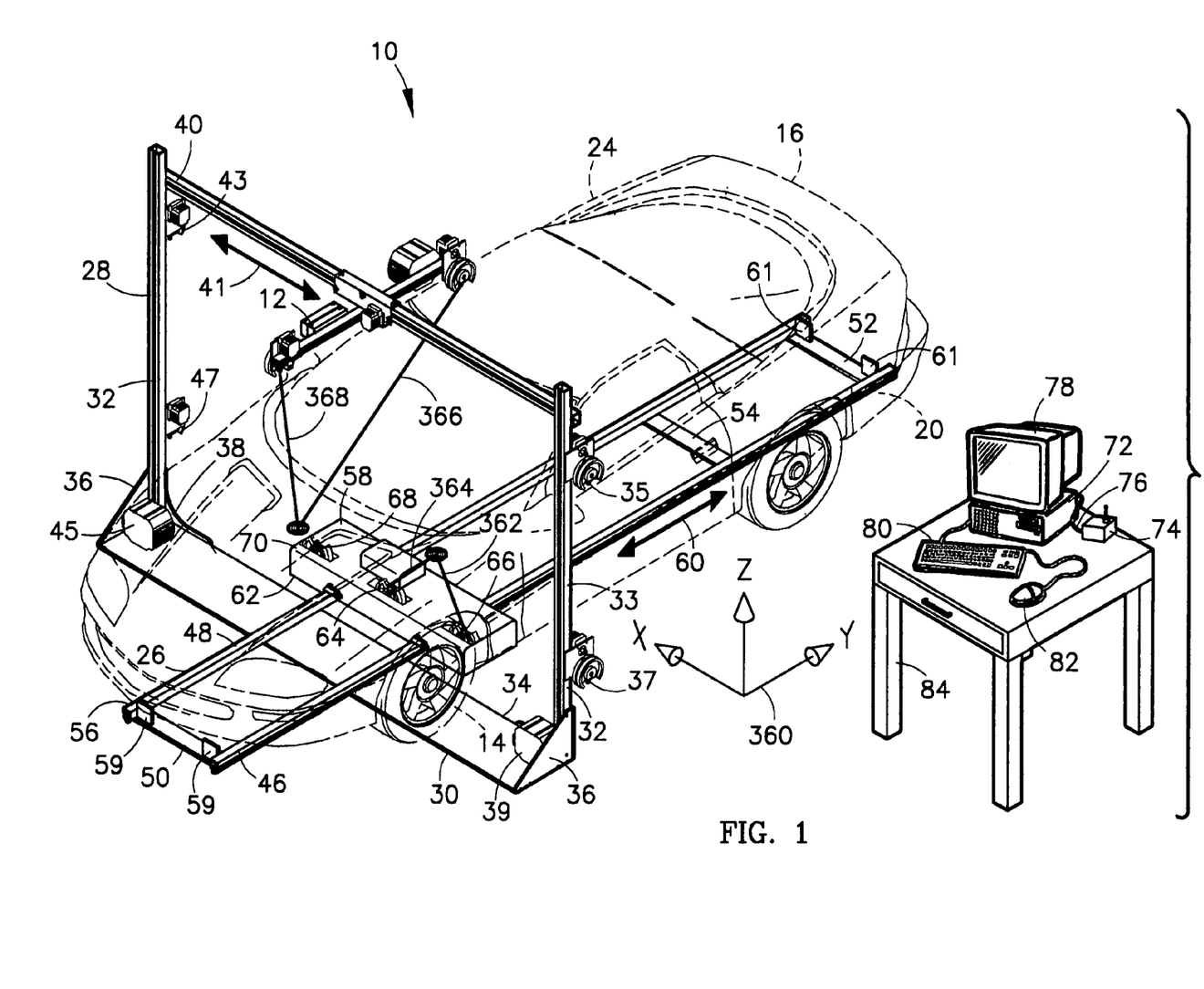
FIG. 1 is an isometric view of a system for measuring points on a vehicle during damage repair according to the present invention shown in use with an automobile and showing the remotely located computer and stand.

Referring to FIG. 1, the system for measuring points on a vehicle during damage repair, or vehicle measuring system 10, includes four different assemblies for measuring points on a vehicle, thereby providing measurement data for nearly the entire vehicle without having to rearrange or move a particular data collection system. A front-end measuring unit 12 is placed approximately in the proximity of the front wheels 14 of the vehicle 16, with the upright frame 28 being perpendicular to the longitudinal centerline of the vehicle 16. The driver's side 20 of the vehicle 16 is defined as the side of the vehicle 16 that is closest to the driver when he is in the driver's seat and the passenger's side 24 is defined as the side of the vehicle 16 that is closest to a passenger in the passenger's seat adjacent to the right-hand side of the vehicle 16 as referenced from the driving position in the car. The second measuring unit is an undercarriage measuring unit 26, which lies flat on the floor underneath the vehicle 16 or another rigid flat surface parallel to the plane of an undeformed vehicle 16 (hereinafter "floor" or "shop floor").

The front-end measuring unit 12, is mounted on a upright frame 28, each of which is identical, except for the horizontal cross member 40. The upright frame includes a flat base plate 30 placed on the shop floor, with the base plate 30 having a rectangular shape wide enough to span the width of the vehicle 16 and a pair of spaced vertical support members, a driver's side vertical support member 32 and a passenger's side support member 33 connected at their lower ends to the outer corners of the rear edge 34 of the base plate 30 by bolting or the like and reinforced by the large gussets 36 and the small gussets 38, which are also bolted together. A horizontal cross member 40 is fixed to the upper ends of the two vertical support members 32, 33 of the front end measuring unit by screws or the like and the measuring unit 18 as appropriate is connected to the horizontal cross member 40, resulting in a measuring unit 18 that is suspended above the shop floor so that the relevant measuring unit 18 can look down on the vehicle 16 body or upper portions of the vehicle 16. The horizontal cross member 40 includes flanges and teeth for gear and pinion reciprocal travel of the measuring unit 18 along it, as shown by the double-headed arrow 41. The drive mechanism for reciprocating the front-end measuring unit 12 along the horizontal cross member 40 is described in detail below.

Mounted on the driver's side vertical frame member 32 is an upper target locating assembly 35 and a lower target locating assembly 37, which are powered and controlled by the combined control module and battery assembly 39, which is electrically connected to the target locating assembly. Mounted on the passenger's side vertical support member 33 is lower passenger's side target locating assembly 47 and an upper target locating assembly 43, both operatively connected to the combined control module and battery 45. All of these target locating assemblies 35, 37, 47, 43 are the target locating assemblies 213 of FIG. 5 or 13, i.e., they can utilize lasers or cameras and rotate in a plane about an axle, see below.

Still referring to FIG. 1, the undercarriage measuring unit 26 includes a pair of spaced apart parallel rails, which are a driver's side rail 46 and a passenger's side rail 48, which are laid on the shop floor and are maintained in their spaced parallel relationship by a front cross brace 50, a rear cross brace 52 and an intermediate cross brace 54, which lies between the front cross brace 50 and the rear cross brace 52, all lying on the shop floor and each brace including two ends, one of which is fastened to the respective rails 46, 48 by any conventional means. This number of cross braces is sufficient to maintain the rails 46, 48 in their parallel relationship and to prevent them from spreading apart under a moderate vertical load. The rails 46, 48 and the cross braces 50, 52, 54 form a ladder track assembly 56 that is placed underneath the vehicle 16 basically along the centerline of the vehicle 16 chassis and that carries a measuring carriage 58, which is mounted on the ladder track assembly 56 for reciprocal movement along the ladder track assembly 56 along the direction of the double-headed arrow 60. The driver's side rail 46 includes a gear rack that is engaged by a pinion on the measuring carriage 58 for driving the measuring carriage 58 along the ladder track assembly 56 in precisely measured increments to move the measuring carriage 58 into position to find specific points of interest on the underside of the vehicle 16, as explained in more detail below.

The measuring carriage 58 includes a measuring carriage chassis 62, that holds measuring instruments and related circuitry including a centerline camera 64, a driver's side camera 66 and a passenger's side camera 68, which lie along the same line and each of which can be rotated in precisely measured increments about a separate axis that is perpendicular to the line the cameras lie along and is horizontal. A housing 70 covers the equipment on the measuring chassis 62, except the cameras 64, 66, 68 and some camera rotation elements, which protrude through slots in the housing 70.

The conventional personal computer 72 is operatively connected to a wireless transmitter and receiver 74 by the cable 76 for receiving wireless signals from a similar transmitter and receiver located inside the housing 70. The personal computer and associated computer display 78, keyboard 80 and computer mouse 82 may be conveniently placed on the table 84 or the like, away from the vehicle 16. Alternatively, cables could be run from the measuring carriage 58 to the personal computer 72, but this alternative clutters the shop floor and could interfere with travel of the measuring carriage 58. The electronic signals from the measuring carriage 58 communicate the position of the measuring carriage 58, the rotational position of the cameras and the location of a target on the vehicle 16, once acquired, to the computer 72, which calculates the absolute position of each target in space from the raw data and then compares that position to a desired position, which has been previously stored in a database available to the computer 72, all of which is explained in greater detail below.

Figure 2:
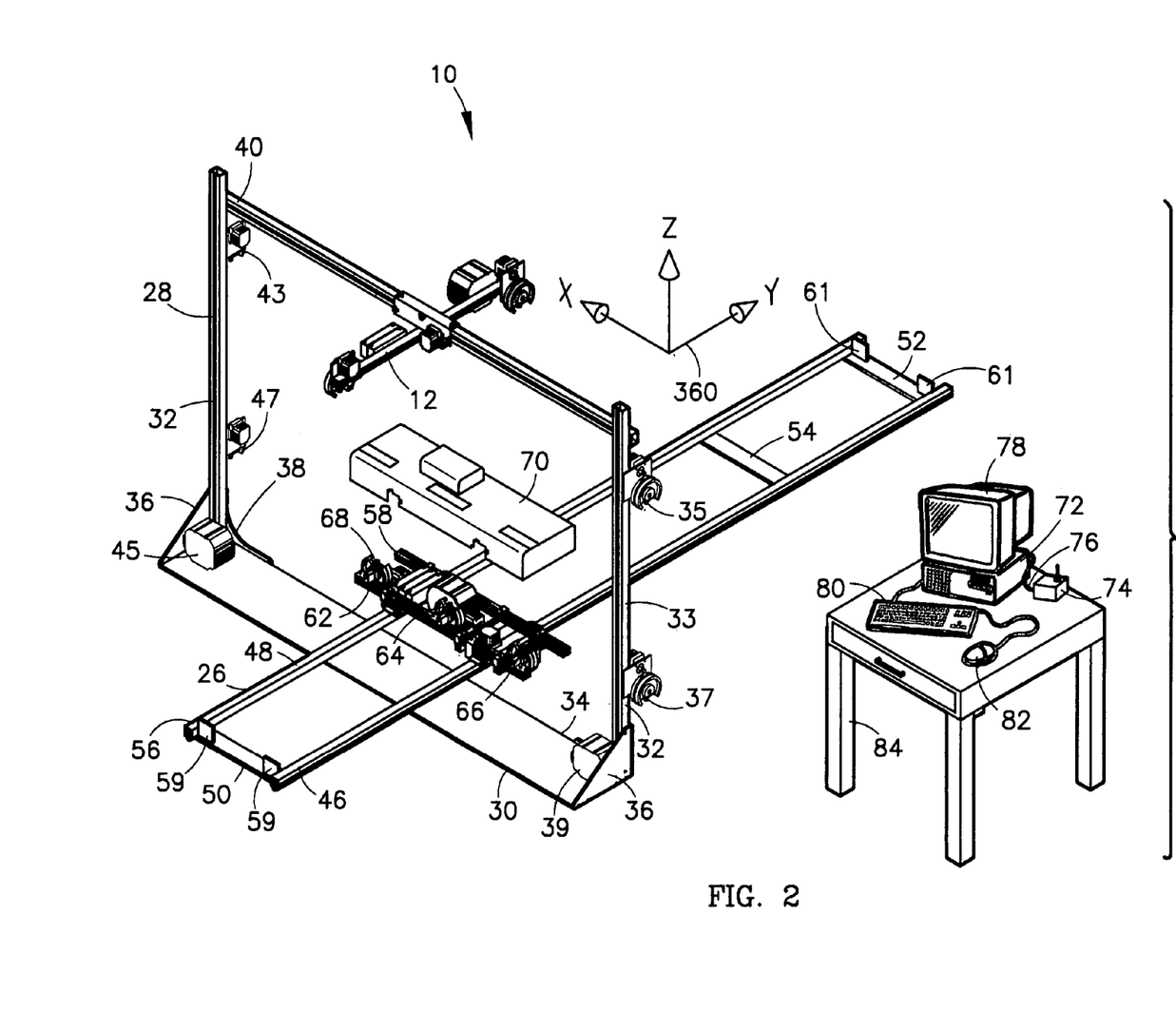
FIG. 2 is an isometric view of the system for measuring points on a vehicle during damage repair of FIG. 1 shown without the motor vehicle.
Figure 3:
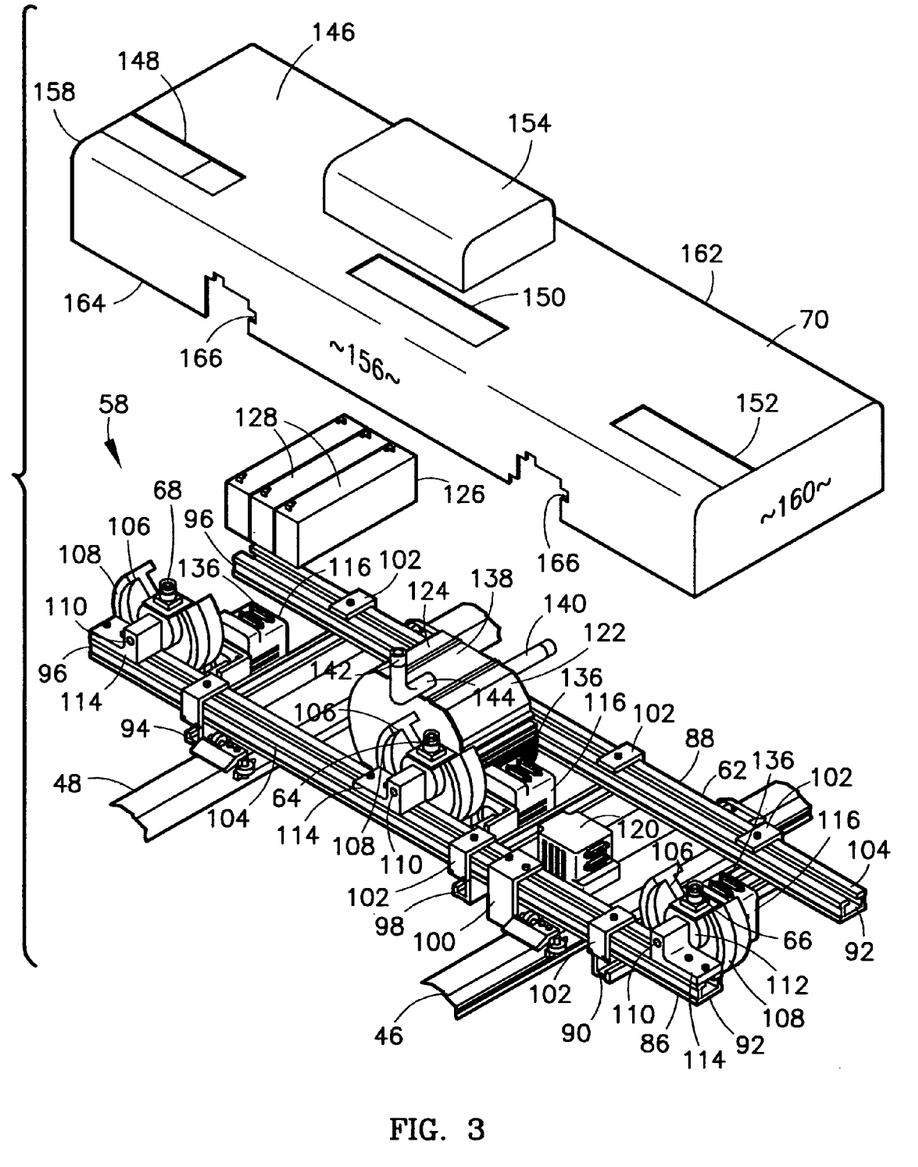
FIG. 3 is an isometric view of the lower instrument, undercarriage measuring carriage, of the system for measuring points on a vehicle during damage repair of FIG. 1 shown with the housing exploded from the assembly.

Referring to FIGS. 2, 3, the measuring carriage 58 chassis 62 includes a front U-shaped frame member 86 and a rear U-shaped frame member 88, which are held in spaced parallel relationship in the same plane by the driver's side cross brace 90 located adjacent to the driver's side ends 92 of the frame members 86, 88, but inward of the driver's side camera 66, the passenger's side cross brace 94, located adjacent to the passenger's side ends 96 of the frame members 86, 88, but inward of the passenger's side camera 68 and the intermediate cross brace 98, located inwardly of the driver's side rail 46 of the ladder track assembly 56. Each of the cross braces 90, 94, 98 includes a main brace body 100 that lies under the frame member 86, 88, and an up-turned bracket 102 on each end that lies along and is fastened to the top surface 104 of each of the front and rear frame member 86, 88.

Each camera 64, 66, 68 is mounted in the notch 106 of a separate but identical pulley wheel 108, each of which is mounted for axial rotation about an axle 110 through the center 112 of each pulley wheel 106, with each end of each axle 108 mounted for rotational movement in an axle mounting bracket 114, which is fixed the top surface 104 of the front U-shaped frame member 86. The axle mounting bracket 114 may include a bearing, such as a sleeve bearing or ball or roller bearings and suitable lubrication with the axle 110 rotating within the aperture in the axle mounting bracket 114 and being fixed in relation to the pulley wheel 106. Each camera 64, 66, 68 is fixed into the bottom of a notch 106 by screws, adhesive or the like. Each pulley wheel 106 is operatively connected to a separate servo motor, or encoder 116 by a cable 118 that is wrapped around the drive shaft of the encoder 116 and around the outer perimeter of the pulley wheel 106, shown and explained in greater detail in FIG. 5 below. An encoder is an electric motor whose drive shaft can be rotated in precisely measured increments, for example up to 2,000 units of movement per rotation of the drive shaft in the present application, and the position of the encoder axle is known at every moment through a feedback signal to a computer. Encoders are commonly used in manufacturing when articles must be moved by precise amounts. A fourth encoder, the drive motor encoder 118, drives the measuring carriage 62 back and forth along the ladder track assembly 56, as shown and described in greater detail in connection with FIG. 4 below. All the encoders 116, 118 are identical.

Figure 9:
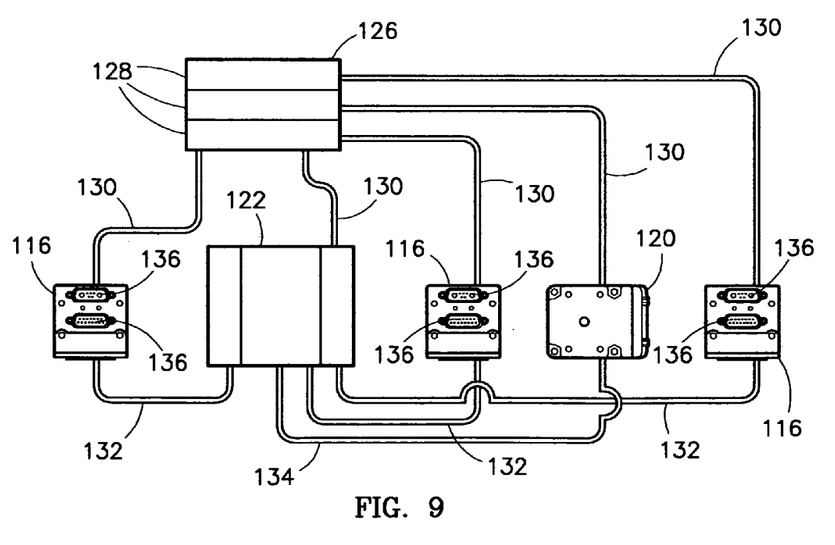
FIG. 9 is a basic electrical schematic showing the connections between the battery, camera movement encoders, and drive motor encoder according to the system for measuring points on a vehicle during damage repair according to FIG. 1.

Seated approximately in the middle of the measuring carriage 58 is the control module 122, which includes the control module housing 124 that covers the control module parts, shown in detail in FIG. 6 and described below. As shown in FIG. 9, all the electrically operated components of the measuring carriage 58 are powered by a rechargeable sealed lead-acid 36 volt battery 126, containing three identical electrical cells 128 electrically connected together to form the battery 126. The battery 126 is electrically connected to the control module 122, and the encoders 116, 118 by the electrical cables 130 (See FIG. 9). Each encoder 116 is connected to the control module by electrical data transfer cables 132, with the drive motor servo or drive motor encoder 120 connected by the drive motor data transfer cables 134. Each electronic data transfer cable 132, 134 includes many pairs of wires and is connected to ports 136 (also FIG. 3) that are similar to conventional personal computer printer cables. One or more, and typically two, separate ports are provided for separate cables on each encoder. Each electronic data transfer cable disclosed herein, including 132, 134 and all others discussed below, is bidirectional and full duplex.

Mounted on the top surface 138 of the control module housing 124 is a horizontal laser pen 140, and in the middle of the measuring carriage 58, which projects a visible beam of laser light horizontally and toward the rear of the vehicle 12 as seen in FIG. 1. This allows an operator to check the alignment of the measuring carriage 58 and the ladder rack assembly 56 to insure that the midpoint of measuring carriage 58 lies along the centerline of the vehicle 12 chassis or other convenient longitudinal axis and that the measuring carriage 58 will run back and forth along the ladder rack assembly 56 with the midpoint of the measuring carriage 58 running under the centerline of the vehicle 12 chassis throughout its travel. The midpoint of the measuring carriage 58 is defined as the point that is equidistant between the driver's side ends 92 and the passenger's side ends 96 of the frame member 86 or 88.

A vertically projecting vertical laser pen 142 continuously projects an exactly vertical visible beam of laser light upwardly along the midpoint of the measuring carriage 58, is mounted on a laser mounting bracket 144 positioned such that the upward projecting beam of laser light is in the same plane as the cameras 64, 66, 68. The vertical laser pen 142 allows the operator to determine when the camera line is aligned directly under points of interest on the vehicle 16 chassis. If desired, the vertical laser pen 142 can be installed so as to sweep continuously along the line defined by the camera 64, 66, 68 to provide a marking line visible due to persistence of vision. Both the horizontal laser pen and the vertical laser pens 140, 142 are continually energized and projecting a laser beam whenever the measuring carriage 58 is turned on and both project a beam of light wherein the beam itself is visible to the human eye along the length of the beam, providing a reference line, but are not strong enough to damage anyone's eyes.

Still referring to FIGS. 2, 3, the housing 70 includes a top wall 146 having a passenger's side slot 148 to accommodate the passenger's side camera 68, a centerline slot 150 to accommodate the centerline camera 64 and a driver's side slot 152 to accommodate the driver's side camera 66. A control module top housing 154 projects upwardly from the top wall 146 to accommodate the control module housing 124 and is sealed as to the top wall 146. The housing 70 further includes a front wall 156, a passenger's side wall 158, a driver's side wall 160 and a rear wall 162, which are each joined at their appropriate edges to form a basically rectilineal housing 70. The front wall 156 has a lower edge 164, which includes two spaced apart identical irregular openings 166 that accommodate the rails 46, 48. This construction allows the housing to seat down onto the measuring carriage 58 as far as practical to prevent dust and debris that may fall from the vehicle 16 during pulling and the like from contaminating the measuring carriage 58, which could damage the components, gum up gears, short out circuits or the like. The slots 148, 150, 152 and the irregular openings 166 may also be fitted with felt or rubber gaskets about their perimeters to reduce the changes of interior contamination further. The housing may be fastened to the measuring carriage chassis 62 by screws or the like.

Figures 4, 5:
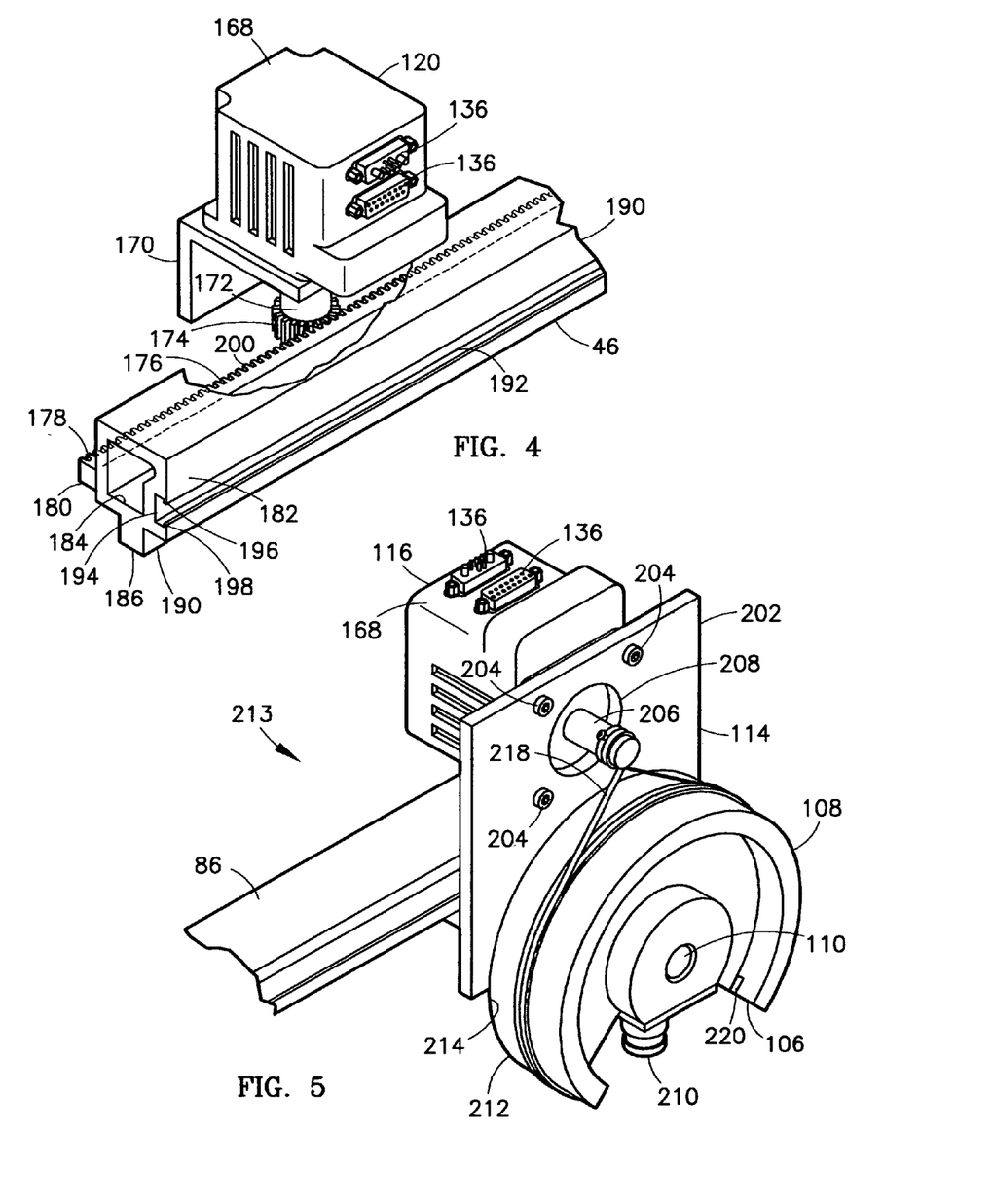
FIG. 4 is an isometric view of the drive mechanism of the lower instrument carriage of FIG. 3.
FIG. 5 is an isometric view of a target locating assembly utilizing a camera of the lower instrument carriage of FIG. 3 and the upright front measuring unit of FIG. 1.

Referring to FIG. 4, the drive motor encoder 120 includes an encoder housing 168 which is fixed to the encoder housing bracket 170, which in turn is fixed to the appropriate cross brace 90, 94, 98. The encoder housing 168 also includes two data transfer connector ports 136. An encoder drive shaft 172 includes a circular toothed drive gear 174 at its distal end, which engages a toothed rack 176, which is formed on an outer edge 178 of a horizontally projecting flange portion 180 along the driver's side rail 46. The flange portion 180 projects inwardly toward the centerline of the vehicle 16 and is horizontal. The driver's side rail 46 includes a basically tubular body portion 182 having a basically square cross section and basically square cross section 184 opening throughout its length. The driver's side rail further includes a depending square cross section bottom portion 186 having a flat bottom surface 188, which rests on the shop floor. The bottom portion 186 is narrower than the tubular body portion 182 and is centered across the width of the tubular body portion 182 and serves as reinforcement, as well as a means for keeping the measuring carriage 58 from contacting the shop floor. On the outer side 190 of the driver's side rail 46 is a recessed track 192 includes a U-shaped horizontally disposed channel 194 having an upper depending flange portion 196 and an upwardly projecting lower flange portion 198, which effectively narrow the recessed track 192 along the outer side 190 of the driver's side rail 46, thereby locking rotational wheels into the recessed track 192. The toothed rack includes a plurality of teeth 200 that mesh with the drive gear 174 and it runs the entire length of the driver's side rail 46.

Figures 10, 11:
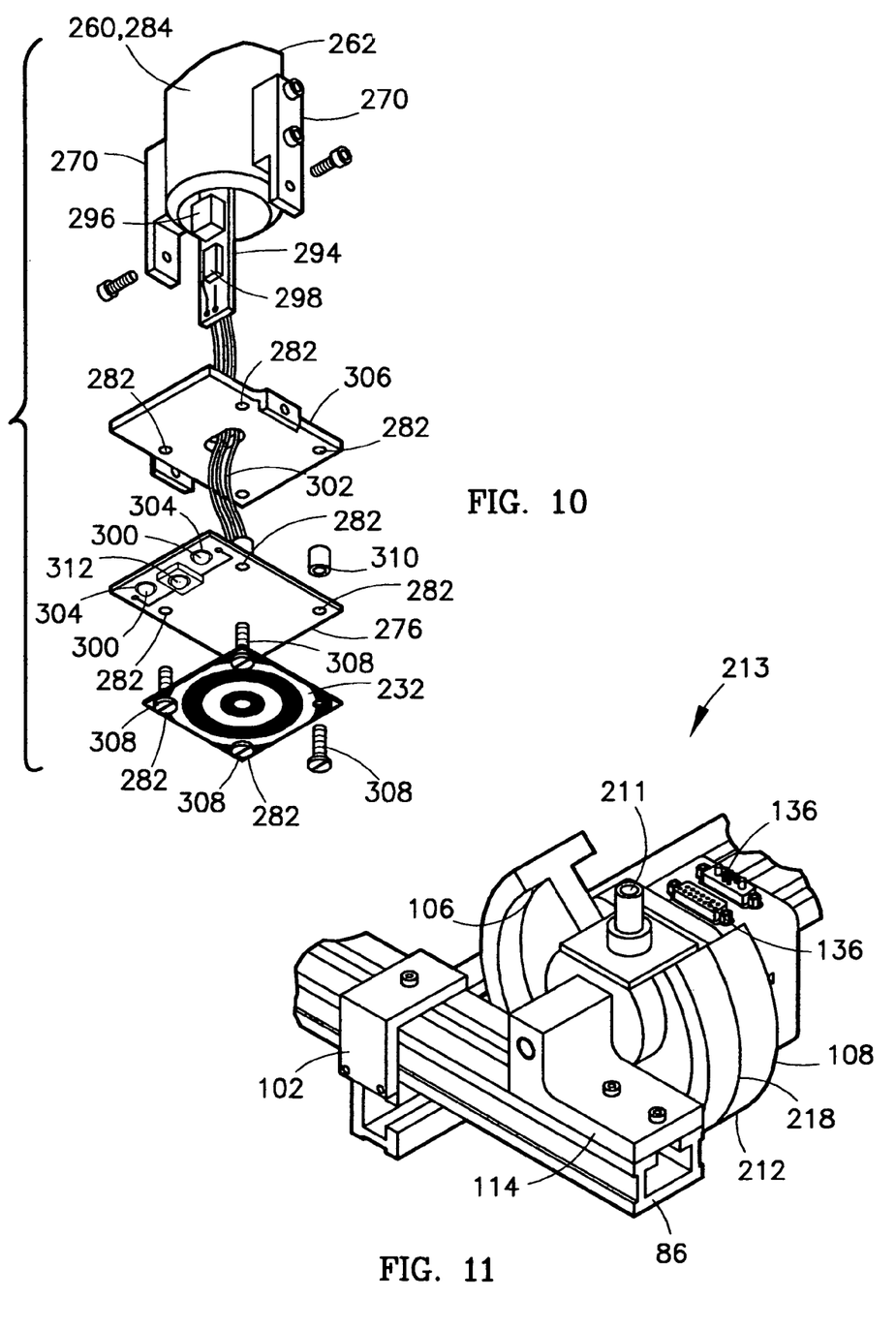
FIG. 10 is an exploded isometric view of the target body of FIG. 10 or 11 showing the electrical components an other hardware.
FIG. 11 is an isometric view of a an alternative embodiment of a target locating assembly utilizing a laser in place of the camera shown in FIG. 5.

Referring to FIG. 5, each camera actuating encoder 116 are the same unit as the drive motor encoder, but the final drive mechanism is different. The encoder 116 is fixed to a vertically oriented mounting plate 202, which is the axle mounting bracket 114 of FIGS. 2, 3 shown in more detail, by four machine screws 204, with the drive shaft 206 projecting through the aperture 208. The mounting plate 202 also carries the axle 110 upon which the pulley wheel 108 is mounted for limited rotational movement about the axis defined by the axle 110. The camera 210 (which is any camera described in this specification as mounted for rotation, including for example, the driver's side camera 66, passenger's side camera 68 and the centerline camera 64). As shown in FIG. 11, the camera 210 can be replaced with the laser 211 in any of the target locating assemblies 213.

The pulley wheel 108 includes a prominent large outer flywheel flange portion 212 to increase its angular momentum and reduce jerky motion and formed into the outer surface 214 of the circumference of the flywheel portion 212 lie a pair of circumferential grooves 216 that receive a drive belt 218 having an end fastened to a edge of the notch 106 by the fastening bracket 220. The opposite end of the drive belt 218 is similarly fastened to the other side of the notch 110. The drive belt 218 is wrapped around the drive shaft 206 twice. This arrangement magnifies the distance that the cameras 210 rotate due to the mechanical advantage of the pulley wheel 108 by a factor in the range of 80:1 to 150:1, with the preferred rotational movement advantage being 100:1. The large rotational movement advantage can b performed while still measuring the movement of the cameras to within 1 mm because the encoder 116 can be accurately moved to any of a number of measured positions for each turn of the drive shaft 206, such as 2,000 units per rotation of the drive shaft in readily available commercial servos or encoders. Any achievable degree of accuracy can readily be employed in the vehicle measuring system 10 to achieve a desired degree of accuracy in measurements. The camera 210 moves only back and forth along an arc of about 90°, that is about 45° to either side of a nominal equilibrium position. The camera 210 shown in FIG. 6 is upside down relative to the cameras in the measuring carriage 58, in order to show the associated hardware more clearly. The orientation in space of the any camera 210 does not affect the performance of the camera 210, encoder 116, pulley wheel 108 and other components related to the camera 210 itself. The orientation only is relevant in that the camera needs to be aimed, more or less, at the object of interest.

Figure 6:
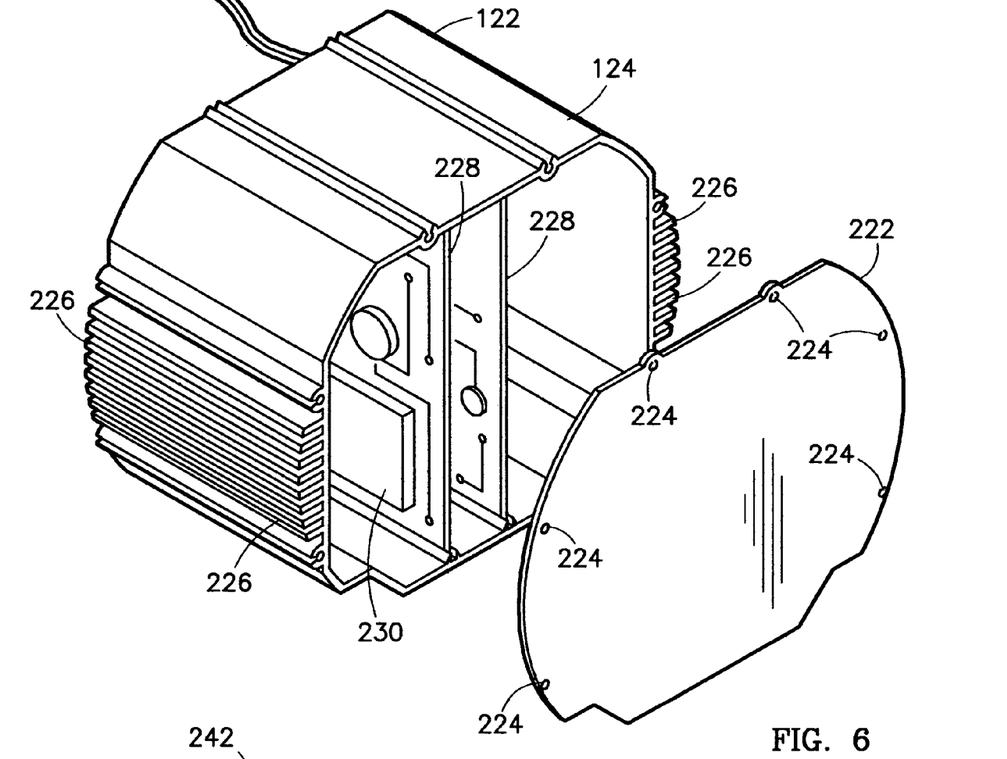
FIG. 6 is an isometric view of a control module housing and enclosed circuitry for use with the system for measuring points during damage repair on a vehicle according to FIG. 1.

Referring to FIG. 6, the control module 122 is seated inside the control module housing 124 has a removable cover 222 having a plurality of apertures 224 spaced about its perimeter for inserting screws to be received in screw sleeves in the control module housing 124. The control module housing includes a plurality of cooling fins 226 projecting outwardly from the outer surface to dissipate excess heat. Located inside the control module housing 124 is a number of circuit boards 228, which contain the electronic circuitry required to operate the vehicle measuring system 10, including the full duplex wireless transmitter and receiver 230, which may operate on infrared or any radio or microwave frequency that is desired and cooperates with the similar wireless transmitter and receiver 74 connected to the computer 72.

Figure 7:
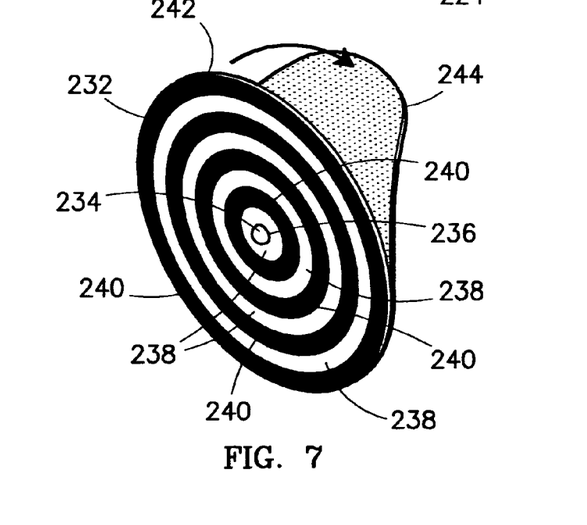
FIG. 7 is an isometric view of a target for use with the system for measuring points on a vehicle during damage repair of FIG. 1 showing the release paper being pulled away from the adhesive backing on the target.

Referring to FIG. 7, a target 232, which may be made from paper, cardboard, or the like or may be printed directly onto a metal or wood plate or the like, includes a center bulls eye 234, which may be the light emitting diode 236 or a dark printed circle, which is surrounded by a plurality of concentric bands of alternating light colored and dark colored rings, with the light colored band 238 preferably being white and the dark colored bands 240 preferably being black, with sharp crisp edges between color changes. The exact number of rings is not important, but a target 232 having at least four light colored bands 238 and at least four dark colored bands 240 is preferred. The cameras will search for and locate the center of the target and then determine its place in space, as discussed below. The target 232 includes an adhesive layer 242 on its back, which is covered by the protective release sheet 244, which is manually peeled away, such as in the direction of the arrow 246 so that the target 232 can be adhesively applied to a target probe body (FIGS. 10–12 below).

Figure 8:
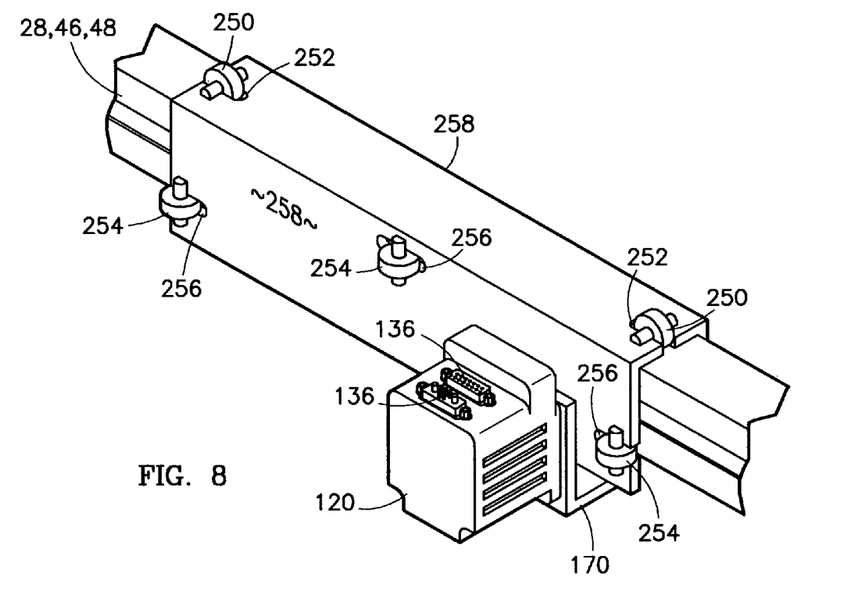
FIG. 8 is a isometric view of a portion of the drive mechanism of an underbody measuring carriage according to the system for measuring points on a vehicle during damage repair showing the idler wheels that permit it to roll along a pair of rails.

Referring to FIG. 8, the mechanism for moving the measuring carriage 58 and the front-end measuring unit 12 includes a U-shaped mounting member 248 having two idler wheels and axle assemblies 250 mounted in corresponding slots 252 in the mounting member 248, and three identical side wall idler wheels and axle assemblies 254 mounted in corresponding slots 256 on each of the vertical side walls 258 of the U-shaped mounting member 248. A U-shaped mounting member 248 is used with each of the members along which one or more cameras reciprocate, that is, a separate U-shaped mounting member 248 slides over the horizontal cross member 42 of the upright frame 28 and over the undercarriage driver's side rail 46 and the passenger's side rail 48 of the undercarriage measuring unite 26.

Referring to FIG. 10 a target probe body 260 includes a cylindrical body 262 that serves as a housing for electrical components (FIG. 10). An upper end 264 of the cylindrical body includes a threaded bore 266 that receives a threaded thumb screw 268 for tightening the target probe body against a vehicle undercarriage point to be referenced and which is inserted into the upper opening of the cylindrical body 262. A pair of opposed depending target legs 270 are attached to a lower portion 272 of the cylindrical body 262. Each target leg has a lower end 274 that is connected to a target plate 276 and that includes a central aperture 278 and which is preferably flat and square and made from metal. The target plate 276 can pivot about the axis defined by the two connection points 280 and its freedom of rotation is about 30° on either side of horizontal. The target 232 is adhesively fixed to the bottom of the target plate 276 or alternatively can be attached by utilizing the mounting apertures 282 on the target plate 276. Being able to tilt the target plate 276 toward a relevant pair of cameras eases the location of a particular target by the relevant cameras.

Figure 12:
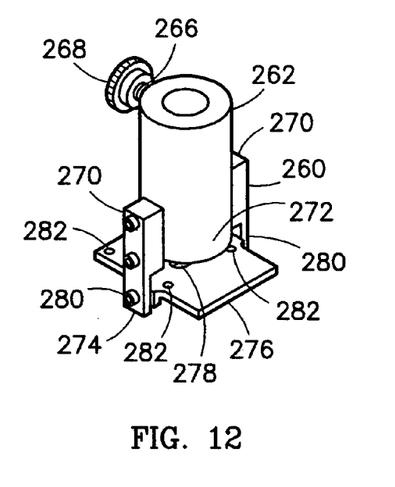
FIG. 12 is an isometric view of a target body for use according to the system for measuring points on a vehicle during damage repair of FIG. 1.
Figure 13:
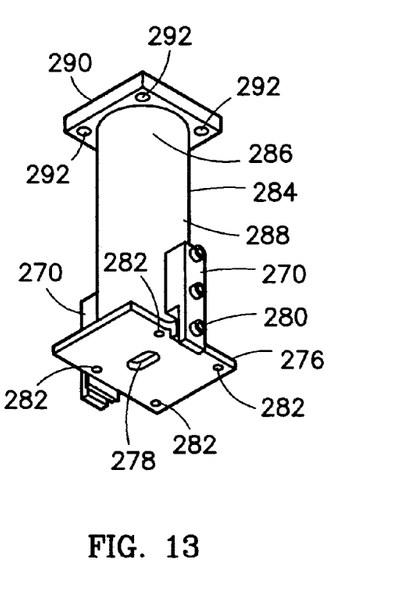
FIG. 13 is an isometric view of a second embodiment of a target probe body for use according to the system for measuring points on a vehicle during damage repair of FIG. 1.

Referring to FIG. 13, a longer target probe 284 is very similar to the target probe body 260 of FIG. 12 and is similarly numbered, except for the following discussion. An upper end 286 of the target probe body 288 has a mounting plate 290 fixed to it, which can be secured to a reference point on a vehicle undercarriage or other point of interest by screws inserted through the mounting apertures 292 or by clips fastened to the reference points and the edges of the mounting plate 290.

Referring to FIG. 10, each target probe 260, 284 contains a circuit board 294 that includes an electrical battery 296, an infrared transmitter 298, which transmits a signal that relates to the carriage control module 122, which includes an infrared receiving, the length of the target probe body, and associated circuitry all operatively and electrically connected. The target mounting plate 290 carries two light emitting diodes 300 electrically connected to the circuit board 294 by the electrical cables 302 and mounted in the apertures 302. The target mounting plate 290 is fastened to a spacer plate 306 along with the target by the nylon screws 308 through apertures 282 all three elements, with the space between the target mounting plate 290 and the spacer plate 306 being maintained by the interposed spacer bushing 310. The light emitting diodes are turned on and off by the switch 312. The light emitting diodes assist in the cameras' locating the targets 232 or other numbered targets by illuminating the targets moderately and by providing a light source that is registered clearly by the cameras.

Figure 14:
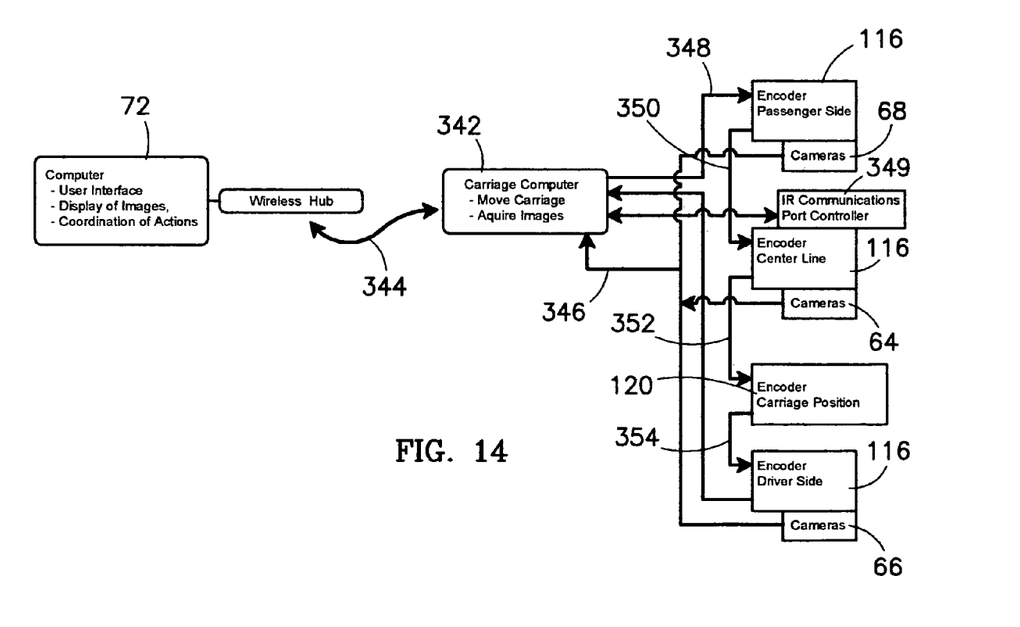
FIG. 14 is a flow chart of the computer software for carrying out the calculations of performed by the system for measuring points on a vehicle during damage repair of FIG. 1.

Referring to FIGS. 13, 14 the underside or bottom of the vehicle frame 314 includes a plurality of repair reference points 316 adjacent to the driver's side 318 and a plurality of repair reference points 320 adjacent to the passenger's side 322. A target probe 284 can be attached to any or all of these reference points 316, 320. The desired or designed location of each of these reference points 316, 320 is compiled for all motor vehicles by commercial companies that make this information available as digital databases which are used by most collision repair shops. The actual location of these reference points 316, 320 after damage is determined and measured by the measuring carriage 58 that travels underneath the vehicle 16.

Figure 15:
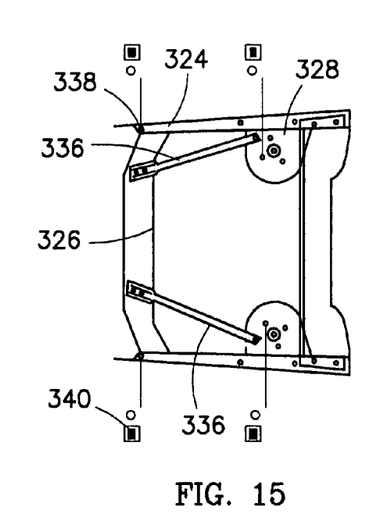
FIG. 15 a schematic top view of the front end of the automobile chassis of FIG. 13 with the automobile hood removed.

Referring to FIG. 15, the front end 324 with the vehicle's hood removed reveals the cowling 326, the top of the driver's side strut tower 328 and related driver's side strut repair reference point 330, the top of the passenger's side strut tower 332 and related passenger's side repair reference point 334, as well as the braces 236. Also shown are the driver's side cowling repair reference point 238 and the passenger's side cowling repair reference point 240. A target probe 284 can be attached to any of these four reference points and their actual locations can be measured by the front end-measuring unit 12 on the upright frame 28.

Referring to FIG. 14, the computer 72 includes is connected to the wireless transmitter and receiver 74 for full duplex communication with the carriage computer 342, housed in the control module housing 124 and forms part of the control module 122. The carriage computer 342 controls the rotational angle of the encodes 116 and associated cameras 68, 64, 66 or lasers 211 and tracks their angular positions by counting the increments of rotation of the encoders 116, all through the data bus 348. The carriage computer 342 also controls operation of the encoder drive motor 120 that drives the measuring carriage 58 back and forth along the ladder track assembly 56 by counting the revolutions of the drive shaft of the encoder drive motor 120. The size of the encoder drive gear 174 and the rack gears or teeth 176 and a measurement with tolerances of 1 mm or less are easily achievable. An infrared communications port controller is also operatively connected to the carriage computer 342. Each of the cameras 68, 64, 66 creates a picture that is converted in the camera to an electrical signal related to the picture and which may be analog or digital and transmits the picture information to the carriage computer along a separate portion of the data bus 346 and each of these picture transmission cables only sends signals to the carriage computer and does not receive any signals, as indicated by the arrowheads leading away from the cameras 68, 64, 66.

The passenger's side 24 encoder 116 is connected to the centerline encoder 116 (connected to the centerline camera 64) by the bus 350, while the encoder 116 on the centerline of ladder track assembly 58 is also connected to the carriage position or drive motor encoder 120 by a separate bus 352. Finally, the drive motor encoder 120 is connected to the driver side 20 encoder 116 by the separate bus 354.

In operation, the vehicle 16 is placed over the undercarriage ladder track assembly 56, with the longitudinal centerline of the vehicle approximately directly above and parallel to the longitudinal centerline of the of the ladder track assembly 56 and is preferably clamped into place to prevent any significant movement of the vehicle 16 in relation to the vehicle measuring apparatus 10. The locations in space of the moveable parts of the vehicle measuring system 10 and of the targets 232 attached to vehicle 16 frame 314 are measured along the xyz coordinate system, with the directions of each of these axes shown by the graphic 360 in FIGS. 1, 2. The origin of the xyz coordinate system is approximately at the centerline camera 64 when the measuring carriage is against the forward stops 59, with one stop 59 on each rail 46, 48 as shown in FIGS. 1, 2. A pair of rear stops 61, one each on the back ends of the rails 46, 48, prevents the measuring carriage from running off the back of the rails 46, 48, as shown in FIGS. 1, 2. The stops 59, 61 may be made of rubber and serve as bumpers.

Figure 16:
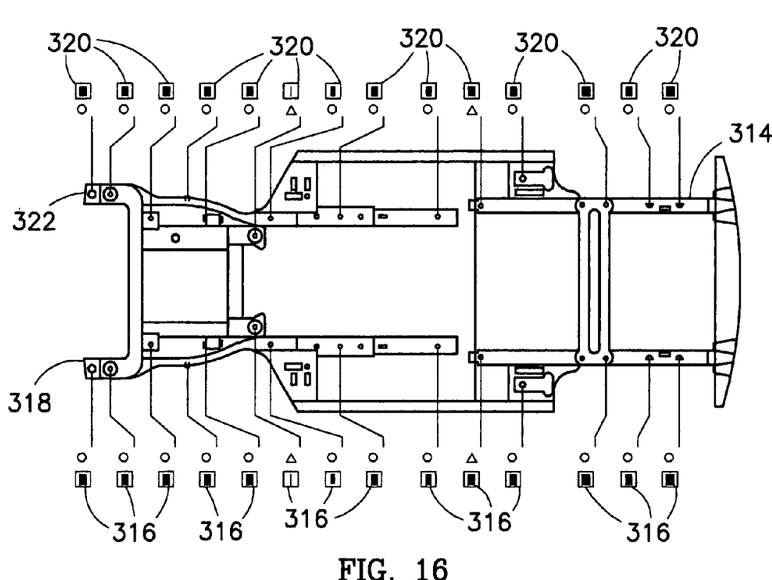
FIG. 16 is an isometrically displayed three-dimensional graph showing a plot of the error in computing the x location of a point to be measured in an xyz coordinate system using a 2,000 encoder.
Figure 17:
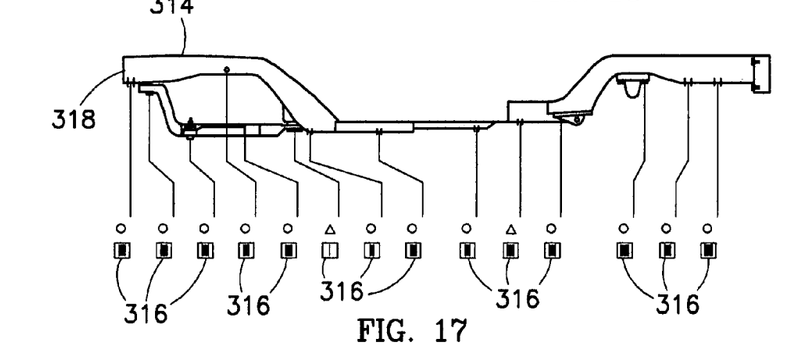
FIG. 17 is an isometrically displayed three-dimensional graph showing a plot of the error in computing the y location of a point to be measured in an xyz coordinate system using a 2,000 encoder.

Referring to FIG. 16, 17, each reference point 316 is located utilizing the driver's side camera 66 and the centerline camera 64 as indicated by the camera lines of sight 363, 364 (FIG. 1) because these are closer to the reference points toward the driver's side of the vehicle 16 and triangulation is more accurate that it would be if the angles of the rays from the cameras were shallower.

Similarly, reference points 314 toward the passenger's side 24 of the vehicle 16 are located by triangulation from the centerline camera 64 and the passenger's side camera 68.

Reference points under the hood of the vehicle 16 as shown in FIG. 15 are located by the two elevated cameras and encoder assemblies 378, 380 on the horizontal cross member 40, with the lines of sight represented by the rays 368, 366 (FIG. 1) respectively when the cameras have centered in on a target 232.

Computer software utilizing well-know programming techniques and employing the law of sines and single value decomposition standards for multiplying matrices, in conjunction with information from the small on-board microprocessors associated with each of the encoders 116, 120, are utilized to determine the position of undercarriage measuring unit 58 and the cameras 64, 66, 68 and the angle of rotation of the cameras 64, 66, 68. Standard infrared signals from each target probe 284 signal to the control module 122 the length of any particular probe. Two of the cameras move through an iteration process of searching for alternating black and white bands on the targets, seeking the center of each target through well-known techniques and when it appears to the control module or computer 72 that both relevant cameras are focused on the center of a target, an electromagnetic signal in the form of a query is sent to the target believed to have been selected, instructing it to flash its light emitting diodes 304 repeatedly, providing bursts of bright light that are perceived by the cameras and associated computers as confirmation of acquisition of a particular target. The location of that target is then calculated utilizing triangulation through the law of sines and that location is compared with the design location in a database stored on the computer 72, with the difference being defined as three dimensional vector. A simple vector subtraction routine then determines the distance and direction that the actual targeted reference point deviates from the designed position for that same reference point. The vehicle 16 is then pulled by hydraulically actuated chains or the like fastened to pulling points on the vehicle 16 (not shown) for some distance and then the target location is measured again; the vehicle is pulled some more and the reference point re-measured and so forth until the reference point has been restored to its original designed location. This process is repeated until all vehicle reference points are restored to their original design specifications in relation to a point of origin on the vehicle.

While the present invention has been described in accordance with the preferred embodiments thereof, the description is for illustration only and should not be construed as limiting the scope of the invention. Various changes and modifications may be made by those skilled in the art without departing from the spirit and scope of the invention as defined by the following claims.

We claim:

1. An apparatus for measuring comprising:
   a. a ladder track assembly in a horizontal plane and placed underneath a motor vehicle;
   b. a measuring unit mounted on said track assembly, said measuring unit further comprising a passenger's side camera, a driver's side camera and a centerline camera mounted on said measuring unit along a line and means for automatically moving said centerline camera between said passenger's side camera and said driver's side camera;
   c. means for automatically and controllably moving said measuring unit along said track assembly.

2. An apparatus in accordance with claim 1 further comprising means for locating a target placed at a specific location on the motor vehicle by a user and means for securing said target to said motor vehicle.

3. An apparatus in accordance with claim 2 further comprising means for determining the distance and direction of displacement of said target from a desired pre-crash position.

4. An apparatus in accordance with claim 2 wherein said target locating means further comprises means for locating said target by moving said measuring carriage back and forth along said ladder track assembly until said target is detected by two of said passenger's side camera, said centerline camera and said driver's side camera and means for measuring the distance from a single reference point on said measuring carriage to a remote point defined by said target through triangulation.

5. An apparatus in accordance with claim 2 further comprising means for said target to signal to said at least two cameras, wherein said signaling means is mounted on said target and further comprising means for electrically powering said signaling means mounted on said target and said signaling means comprising broadcasting electromagnetic radiation.

6. An apparatus in accordance with claim 5 wherein said target further comprises a bull's eye comprising a center surrounded by a plurality of concentric bands and means for first locating said target through said signaling means and means for utilizing said bull's eye for measuring said distance and direction of displacement of said target from a desired pre-crash position.

7. An apparatus in accordance with claim 1 further comprising means for rotating said passenger's side camera, said driver's side camera and said centerline camera independently of each other about an axis of said passenger's side camera, of said driver's side camera and of said centerline camera, with each said camera rotating within a single plane and means for measuring the angle of rotation of each said camera.

8. An apparatus in accordance with claim 1 further comprising means for automatically measuring the position of said measuring unit along said ladder track assembly relative to a reference point located on said ladder track assembly.

9. An apparatus in accordance with claim 1 further comprising means for powering said measuring unit mounted on said measuring unit.

10. An apparatus in accordance with claim 1 further comprising means for wireless full duplex communication between said measuring unit and a remotely located computer.

11. An apparatus for measuring comprising:
  a. a ladder track assembly disposed in a horizontal plane on a floor and placed under a body to be examined;
  b. a measuring unit mounted on said ladder track assembly, said measuring unit further comprising a passenger's side camera, a driver's side camera and a centerline camera mounted on said measuring unit along a line and means for automatically moving said centerline camera between said passenger's side camera and said driver's side camera;
  c. means for automatically and controllably moving said measuring unit back and forth along said track assembly mounted on said measuring unit; and
  d. at least one target placed onto a body to be examined at a location remote from said track assembly and from said measuring unit and above said measuring unit; and
  e. means for locating said target relative to a reference point, said locating means further comprising means for selecting a pair of said cameras consisting of said centerline camera and either said passenger's side camera or said driver's side camera for locating a specific said target.

12. An apparatus in accordance with claim 11 further comprising means for pivoting each of said passenger's side camera, said centerline camera and said driver's side camera about an axis of each said camera, with each said camera being rotated in the same plane and means for determining the angle of rotation of each said camera.

13. An apparatus in accordance with claim 11 further comprising means for signaling from said target to each said camera and for signaling said target from each said camera from a signal means mounted adjacent to each said camera.

14. An apparatus in accordance with claim 11 wherein said target further comprises a bull's eye comprising a center surrounded by a plurality of concentric bands, said bull's eye and said concentric bands having one consistent color and being applied to a background having a contrasting color.

15. An apparatus for measuring comprising:
  a. a ladder track assembly disposed in a horizontal plane on a floor and placed underneath a motor vehicle, said ladder track assembly further comprising a pair of spaced parallel rails comprising a driver's side rail and a passenger's side rail connected together by at least one brace;
  b. a measuring unit mounted on said ladder track assembly, said measuring unit further comprising a passenger's side camera, a driver's side camera and a centerline camera mounted on said measuring unit along a line and means for automatically moving said centerline camera between said passenger's side camera and means for pivoting the aiming direction of each said camera with all three said cameras being pivotal for rotational movement in a single plane;
  c. means for controlled movement of said measuring unit back and forth along said ladder track assembly, said moving means mounted on said measuring unit and means for powering said movement of said measuring unit and said cameras mounted on said measuring unit;
  d. means for measuring the position of said measuring unit relative to a reference point on said ladder rail assembly, said measuring means mounted on said measuring unit;
  d. at least one target placed at a location remote from said ladder track assembly and from said measuring unit on the underneath side of a chassis of said motor vehicle; and
  e. means for locating said target said locating means further comprising said measuring unit and a computer and means for wireless full duplex communication between said measuring unit and said computer.

16. An apparatus in accordance with claim 15 further comprising automatic means for sequentially determining the locations of a plurality of targets placed at selected locations on the underside of a vehicle chassis and determining the distance and direction of each said target from a corresponding number of designed locations.

17. An apparatus in accordance with claim 16 further comprising means for wirelessly transmitting digital information from said measuring unit to a display means and displaying the information acquired through said target location means and said distance and direction determination means.

* * * * *